Nov. 27, 1956 R. M. CARRIER, JR 2,771,983
SPIRAL CONVEYOR
Filed April 29, 1952 2 Sheets-Sheet 2

INVENTOR.
ROBERT M. CARRIER JR.
BY
Oberlin & Limbach
ATTORNEYS

# United States Patent Office 2,771,983
Patented Nov. 27, 1956

2,771,983

SPIRAL CONVEYOR

Robert M. Carrier, Jr., Louisville, Ky., assignor to Carrier Conveyor Corporation, Louisville, Ky., a corporation of Kentucky Application April 29, 1952, Serial No. 285,019

12 Claims. (Cl. 198—220)

The present invention relates generally as indicated to a spiral conveyor and more particularly to a spiral conveyor of the directional throw type wherein the spiral or helical material supporting and conveying pan thereof is vibrated along a helical path oblique to the material supporting surface of the pan so that the material is conveyed spirally upward.

Among the primary objects of this invention are to provide a unique resilient supporting and guiding mechanism for the conveyor which causes vibration of the conveyor along a generally helical path as aforesaid; to provide a conveyor vibrating means which imparts vibrations at a frequency corresponding to the natural frequency of the resilient conveyor support and at a predetermined amplitude irrespective of the various settled positions of the conveyor on its resilient support under varying loads of material thereon; and to provide a novel resilient bearing assembly for that end of the spiral conveyor which is opposite to that at which the resilient supporting and guiding mechanism therefor is located.

Other objects and advantages will become apparent as the following description proceeds.

To the accomplishment of the foregoing and related ends, the invention, then, comprises the features hereinafter fully described and particularly pointed out in the claims, the following description and the annexed drawing setting forth in detail one illustrative embodiment of the invention, this being indicative, however, of but one of the various ways in which the principle of the invention may be employed.

Figure 1:
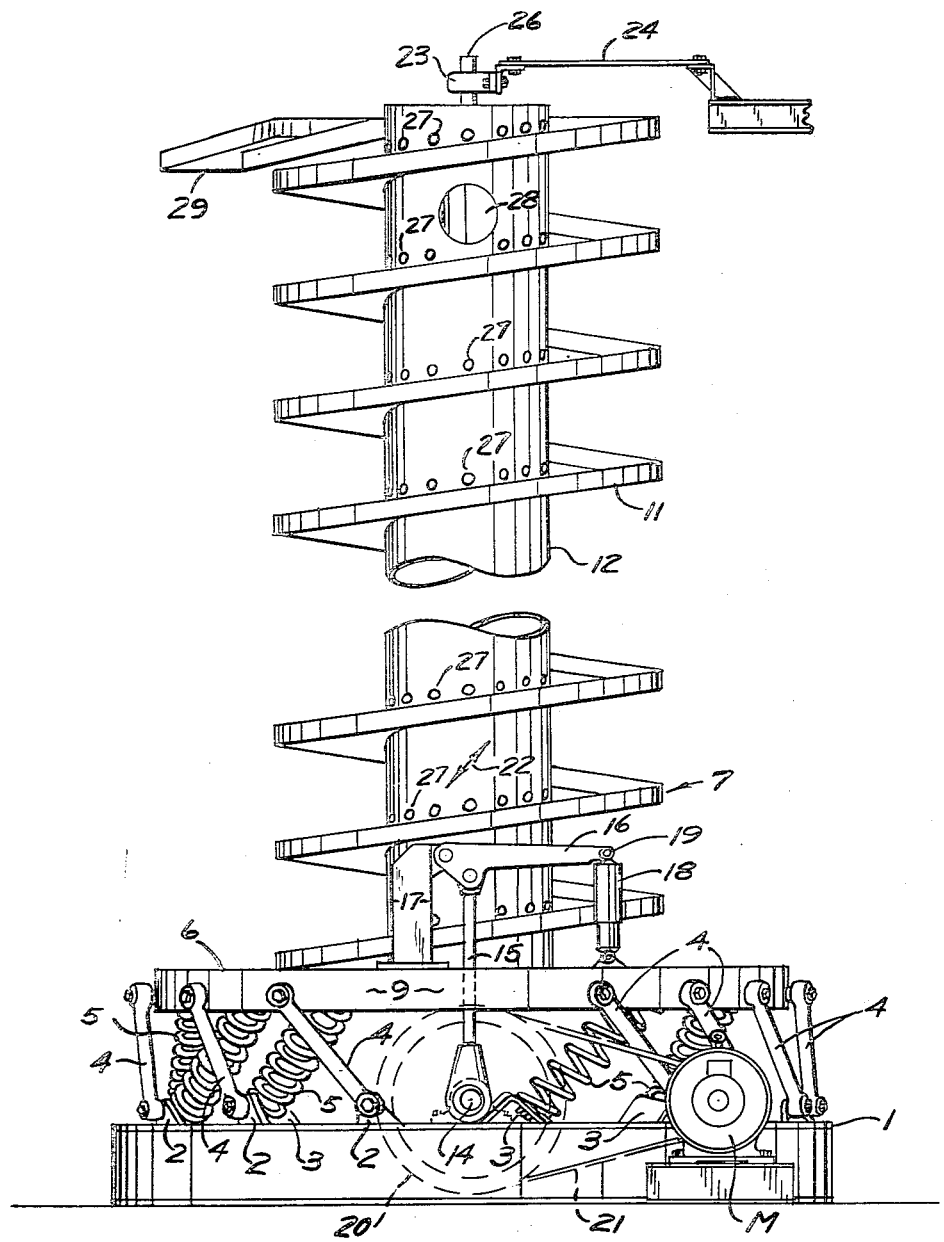
Fig. 1 is a side elevation view of a spiral conveyor embodying the present improvements.

Broadly stated, the present resilient supporting and guiding mechanism for the spiral conveyor comprises two series of obliquely disposed support members, one series of which members are coil compression springs or the equivalent having their axes disposed at an angle corresponding to the angle of the path of vibration which it is desired to impart to the spiral conveyor, and the other series of which members constitute guides and also supports which are preferably in the form of rods pivotally secured to the conveyor so as to have a path of movement substantially coinciding with the desired path of vibration of the spiral conveyor. Accordingly, said two series of members jointly support the conveyor, the coil springs being effective to resiliently support the conveyor and the rod members being effective to guide the conveyor for vibration along such desired path and at the same time to prevent deformation of the coil springs transversely of their axes by the weight of the conveyor and the load of conveyable material thereon.

Referring now more particularly to the drawing, there is provided a base plate 1 having a series of circularly arranged and uniformly spaced brackets 2 welded or otherwise secured thereto and similarly arranged spring abutment members 3 also welded or otherwise secured to said base plate. As shown, the lower ends of a sereis of obliquely disposed rods 4 are pivotally secured to the brackets 2 and obliquely disposed coil springs 5 are arranged to bear against the coil spring abutment members 3. The upper ends of said rods 4 are pivotally secured as shown around the periphery of the base 6 of the spiral conveyor 7, said rods preferably being disposed at an angle of approximately 55° from horizontal whereby a vertical energy impulse transmitted to the conveyor 7 will result in a movement of the conveyor 7 along a path substantially as described by the upper ends of said rods 4.

The base 6 of the conveyor 7 is composed of concentric rings 8 and 9 of angle cross-section provided with cross members 10 which join said rings together and against which the upper ends of the coil springs 5 bear, said springs preferably being inclined upwardly at an angle of approximately 40° from horizontal and tangent to the base 6 so that the axes of said springs will be disposed generally parallel to the paths of movement of the upper ends of said rods 4.

The rods 4 will preferably be provided with rubber bushings or the like at their pivotal ends so that the conveyor may move in a helical or inclined arcuate path when vertical energy impulses are transmitted thereto.

The conveyor 7 comprises a helical pan or trough 11 disposed around a vertical center tube 12, the inner edge of said pan being welded or otherwise secured to said center tube and the lower end of said tube being secured to the conveyor base 6.

Energy impulses are transmitted to the conveyor 7 through an eccentric drive shaft 14 which when driven by motor M causes generally vertical reciprocation of a pair of connecting rods 15 located on opposite sides of said conveyor base 6, the upper end of each rod 15 being pivotally connected to an arm 16, which arm 16 in turn is pivotally connected at its ends to an upstanding bracket 17 fixed on said conveyor base and to a hydraulic shock absorber 18 or equivalent unit which provides a fixed fulcrum 19 at operating frequency of the conveyor 7 but yet allows the conveyor to settle under load on its resilient support. In other words, at the frequency of operation of the conveyor (for example 500 cycles per minute) there is no opportunity for alternate lengthening and shortening of the units 18 except for a gradual lengthening or shortening to allow the conveyor 7 to settle on its resilient mounting according to its own weight and the load of conveyed material thereon. Thus, for any settled position of said conveyor 7 the rods 15 will transmit, through the arms 16 and brackets 17, to the conveyor base 6 a predetermined substantially uniform amplitude of vibration, the frequency of which preferably is equal to the natural frequency of the springs 5 whereby much reduced input power is required since only frictional losses in the conveyor supporting mechanism and internal friction of the coil springs 5 must be overcome. The eccentric drive shaft 14 is provided with a pulley 20 or the like thereon over which is trained a belt 21 driven by motor M.

In view of the foregoing, it is now clear that when the drive shaft 14 is rotated at the natural frequency of the coil springs 5, generally vertical energy impulses will be transmitted to the conveyor 7 and by reason of the oblique disposition of the coil springs 5 and of the rods 4, said conveyor will be caused to vibrate along a generally helical path as indicated by the line 22, which path of vibration is generally parallel to the spring axes and paths of swinging of the rods 4 and has a helix angle greater than that of the material supporting pan or trough 11 thereof. Therefore, material on the pan or trough will be tossed upwardly and forwardly relative to the material supporting surface of the pan and thus conveyed vertically.

Figure 4:
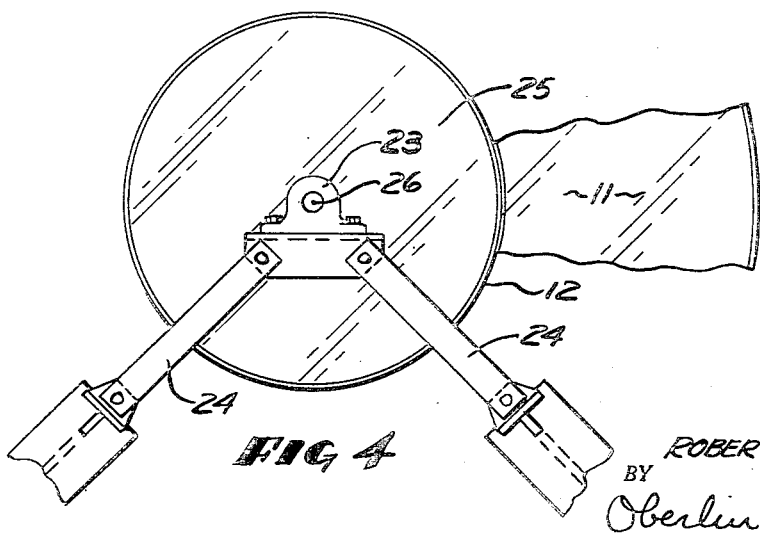
Fig. 4 is a top plan view of the center bearing for the upper end of the spiral conveyor.

In the case of relatively tall spiral conveyors 7, it is desirable and often necessary to provide a support for the upper end thereof. In the present case (see Figs. 1 and 4) such support for the upper end of the conveyor comprises a center bearing 23 and diverging leaf springs 24 adapted to be secured at their outer ends to the building walls or other building structure. The upper end of the center tube 12 is closed as by means of a disk 25 from which extends a vertical shaft 26 which is vertically reciprocable and rotatable in the bearing 23.

The center tube 12 may be perforated as at 27 and provided with an air pressure inlet or suction port 28 to cause air to issue from or to flow into the perforations 27 and thus sweep across the surface of the bed of material while the material is being conveyed upwardly around the pan 11.

The upper end of the pan 11 terminates in a discharge chute 29 or the like from which the conveyed material is discharged.

Figure 2:
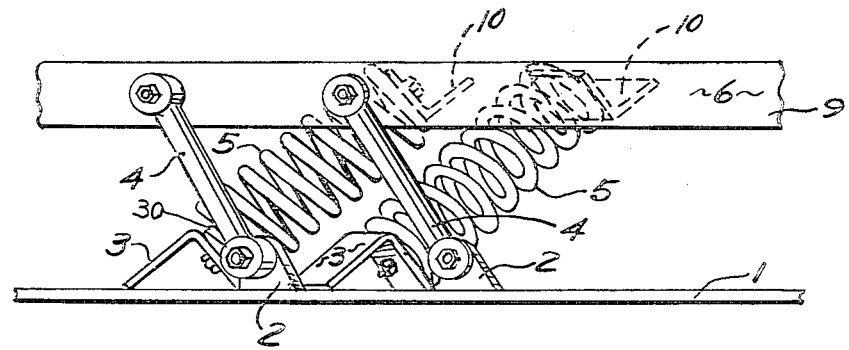
Figs. 2 and 3 are enlarged side elevation and top plan views of a portion of the resilient supporting and guiding mechanism.
Figure 3:
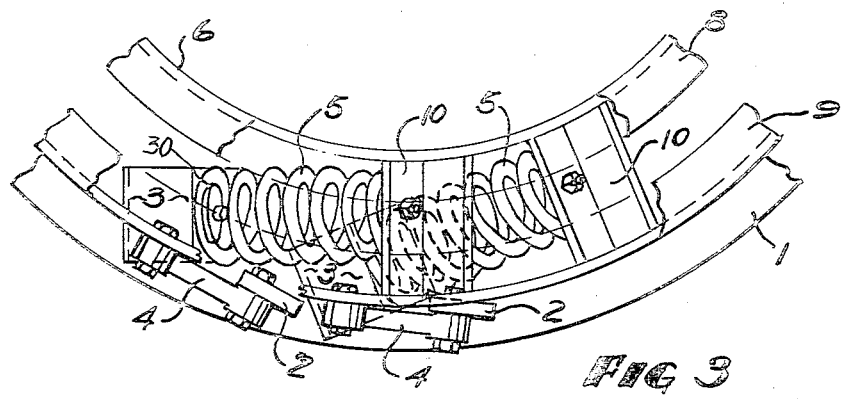

As best shown in Figs. 2 and 3 the opposite ends of the coil springs 5 will be bolted or otherwise secured to the brackets 3 and 10 as through the intermediary of clamping ring 30.

Other modes of applying the principle of the invention may be employed, change being made as regards the details described, provided the features stated in any of the following claims, or the equivalent of such, be employed.

I therefore particularly point out and distinctly claim as my invention:

1. In combination, a conveyor having a helical conveying surface, means for resiliently supporting and guiding said conveyor for vibration along a generally helical path to convey material on said surface longitudinally thereof, and impulse generating means adapted to vibrate said conveyor, said impulse generating means comprising a pair of upstanding members on said conveyor, a generally horizontal arm pivotally connected to said members, and a generally vertically reciprocating rod pivotally connected to said arm between said members, one of said members being extensible to allow said conveyor to settle on its resilient support according to the load of material thereon and constituting a substantially rigid link during vibration of said conveyor so that the latter will be vibrated at a substantially uniform amplitude corresponding with the stroke of said reciprocating rod.

2. The combination of claim 1 wherein said one member comprises a hydraulic shock absorber of the type which gradually lengthens and shortens but which remains of substantially fixed length at the frequency of vibration of said conveyor.

3. In combination, a conveyor having a helical conveying surface, means for resiliently supporting and guiding said conveyor for vibration along a generally helical path to convey material on said surface longitudinally thereof, and impulse generating means adapted to vibrate said conveyor, said impulse generating means comprising a pair of spaced apart members on said conveyor, an arm pivotally connected to said members, and a reciprocating rod pivotally connected to said arm, one of said members being extensible to allow said conveyor to settle on its resilient support according to the load of material thereon and constituting a substantially rigid link during vibration of said conveyor so that the latter will be vibrated at a substantially uniform amplitude corresponding with the stroke of said reciprocating rod.

4. The combination of claim 3 wherein said one member comprises a hydraulic shock absorber of the type which gradually lengthens and shortens but which remains of substantially fixed length at the frequency of vibration of said conveyor.

5. The combination of claim 3 wherein said reciprocating rod is pivotally connected to said arm at a point which is substantially closer to the other one of said members than to said one of said members to thereby correspondingly reduce the forces tending to extend the latter during vibration of said conveyor.

6. In combination, a conveyor having a helical conveying surface, a base, and means for resiliently supporting and guiding said conveyor for vibration with respect to said base along a generally helical path to convey material longitudinally along said surface, said means comprising springs connected to said base and said conveyor to provide a resilient support for vibration of the latter in a direction generally parallel to such path of vibration, and guide rods extending angularly to such path of vibration and each having pivotal connections with said base and conveyor respectively, at least one of such pivotal connections permitting limited universal movement for helical vibration of said conveyor and consequent changes of relative angular position of the axes of the pivotal connections.

7. The combination of claim 6 wherein said one of such pivotal connections includes rubber-like resilient elements operatively disposed between one of said conveyor and base and the rods connected thereto.

8. In combination, a conveyor having a helical conveying surface, a base, and means for resiliently supporting and guiding said conveyor for vibration with respect to said base along a generally helical path to convey material longitudinally along said surface, said means comprising springs connected to said base and said conveyor to provide a resilient support for vibration of the latter in a direction generally parallel to such path of vibration, and guide rods extending angularly to such path of vibration and each having rubber-bushed eyes pivotally fitted over generally parallel pivots on said base and said conveyor respectively and effective to permit helical vibration of said conveyor and consequent changes of relative angular position of the axes of the pivots.

9. In combination, a conveyor having a helical conveying surface, a base, and means for resiliently supporting and guiding said conveyor for vibration with respect to said base along a generally helical path to convey material longitudinally along said surface, said means comprising a circularly, obliquely arranged series of coil springs connected to said base and said conveyor to provide a resilient support for vibration of the latter in a direction generally parallel to such path of vibration, and a circularly, obliquely arranged series of guide rods extending angularly to such path of vibration and each having pivotal connections with said base and conveyor respectively to thus afford lateral support for said series of coil springs, at least one of such pivotal connections permitting limited universal movement for helical vibration of said conveyor and consequent changes of relative angular position of the axes of the pivotal connections.

10. In combination, a conveyor having a helical conveying surface, a base, and means for resiliently supporting and guiding said conveyor for vibration with respect to said base along a generally helical path to convey material longitudinally along said surface, said means comprising a circularly, obliquely arranged series of coil springs connected to said base and said conveyor to provide a resilient support for vibration of the latter in a direction generally parallel to such path of vibration, and a circularly, obliquely arranged series of guide rods extending angularly to such path of vibration and each having pivotal connections with said base and conveyor respectively to thus afford lateral support for said series of coil springs, such pivotal connections being rubber-bushed to permit limited universal movement for helical vibration of said conveyor and consequent changes of relative angular position of the axes of the pivotal connections.

11. In combination, a conveyor having a helical conveying surface, a base, and means for resiliently supporting and guiding said conveyor for vibration with respect to said base along a generally helical path to convey material longitudinally along said surface, said means comprising springs connected to said base and said conveyor to provide a resilient support for vibration of the latter in a direction generally parallel to such path of vibration, guide rods extending angularly to such path of vibration and each having pivotal connections with said base and conveyor respectively, at least one of such pivotal connections permitting limited universal movement for helical vibration of said conveyor and consequent changes of relative angular position of the axes of the pivotal connections, and center bearing means at the end of said conveyor opposite said means for resiliently supporting and guiding said conveyor for additionally supporting said conveyor for vibration as aforesaid about the axis of the conveying surface.

12. The combination of claim 11 wherein said center bearing means includes a bearing and divergent horizontal leaf springs adapted for connection at their outer ends to a rigid support, said conveyor having a center shaft axially slidable and rotatable in said bearing.

References Cited in the file of this patent

UNITED STATES PATENTS

| 1,016,568 | Landes | Feb. 6, 1912 |
| 2,332,600 | Rapp | Oct. 26, 1943 |
| 2,535,050 | Devol | Dec. 26, 1950 |
| 2,630,210 | Carrier et al. | Mar. 3, 1953 |

FOREIGN PATENTS

| 695,938 | Germany | Sept. 6, 1940 |